July 26, 1960    E. VALLAK    2,946,103
HOT TOPS

Filed Aug. 4, 1958    2 Sheets-Sheet 1

INVENTOR:
ENN VALLAK,
BY
HIS ATTORNEY.

July 26, 1960     E. VALLAK     2,946,103
HOT TOPS

Filed Aug. 4, 1958     2 Sheets-Sheet 2

INVENTOR:
ENN VALLAK,
BY
*Ernest D. Marunek*
HIS ATTORNEY.

United States Patent Office 2,946,103
Patented July 26, 1960

2,946,103
HOT TOPS

Enn Vallak, 26 Ave. Krieg, Geneva, Switzerland

Filed Aug. 4, 1958, Ser. No. 752,958

2 Claims. (Cl. 22—147)

The invention relates to hot tops of the type that are used in connection with molds for metal castings such as ingots or the like, and relates more particularly to methods of and means for retaining such a hot top in position near the top on a casting mold.

The general purpose of hot tops is to retard the cooling of the upper surface of the cast molten metal; the purpose is set forth in detail in the available literature, for instance in my Patent No. 2,821,758, dated February 4, 1958. Hot tops may be made of various materials, such as of combustible or of noncombustible, of porous or non-porous, and of gas-permeable or impermeable material, but the instant invention is not restricted to any special kind of material, and includes hot tops of any and all suitable materials usable for the purpose.

Hot tops have a tendency to float on the surface of the molten metal in the mold, when the level of the metal reaches the hot top as it rises during the casting-in of the metal into the mold. When the hot top floats on the surface of the molten metal, it will be lifted out of the mold, with consequently impaired usefulness.

Efforts have been made in the past to prevent the floating and carrying away of the hot tops, but these efforts were found to be wasteful, expensive, inconvenient and, above all, unreliable.

It is, accordingly, among the principal objects of the invention to provide for anchoring of a hot top, so that the hot top will remain in the required position on the mold.

It is another object of the invention to anchor the hot top by freezing it to the solidifying shell of the molten metal in the mold.

It is a further object of the invention to provide a hot top with anchoring means that reach from the hot top into the region in which portions of the molten metal will first solidify in form of a freezing shell, to be frozen thereto for anchoring.

Further objects and advantages of the invention will be set forth in part in the following specification and in part will be obvious therefrom without being specifically referred to, the same being realized and attained as pointed out in the claims hereof.

When molten metal is poured into a mold, it will not solidify uniformly, but the portions nearest the internal mold wall will solidify first and will form a solidified or frozen skin or shell, while the remainder of the metal mass in the mold will still be in a molten state. The invention utilized this phenomenon. Broadly speaking, the instant invention provides for an anchoring element or elements projecting from the hot top and reaching into that region of the mold in which the solidified shell will be formed, so that the anchoring elements will be frozen to the solidified shell and thus will resist the floating pressure of the molten metal, so that the hot top will be retained in its original position on the mold.

Various embodiments have been illustrated in the accompanying drawings for the purpose of exemplification only. In the drawings, Fig. 1 is a longitudinal vertical sectional view of a chill mold with a hot top according to an embodiment of the invention illustrating the stage of casting wherein the level of the molten metal has not yet reached the bottom of the hot top;

Figure 1:
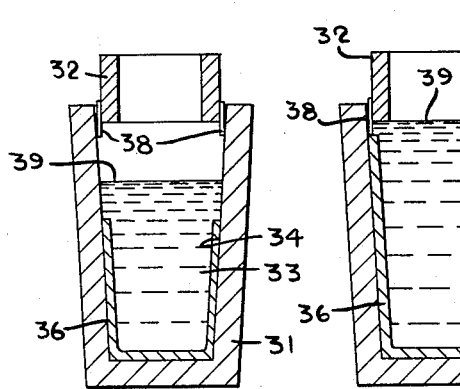
Figure 2:
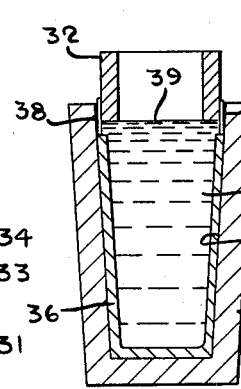
Fig. 2 is a vertical sectional view, similar to Fig. 1, but illustrating the stage wherein the level of the molten metal has reached the bottom of the hot top.
Figure 3:
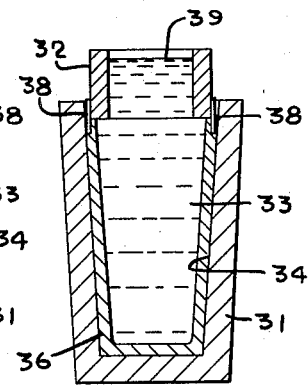
Fig. 3 is a vertical sectional view, similar to Fig. 1, but showing the stage wherein the level of the molten metal has entered from the mold into the hot top and reached its maximum height.

In carrying the invention into effect in the embodiments which have been selected for illustration in the accompanying drawings and for description in this specification, and referring now particularly to Fig. 1–3, there is provided a chill mold 31 that may be of any shape or material, and is open on top. It defines a metal receiving chamber. A hot top 32 removably surmounts the mold 31 at the open top of the mold chamber and may, for instance as shown in Figs. 1–3, be inserted partially into the open top of the mold 31.

Molten metal 33, such as steel or other ferrous or non-ferrous metal is shown cast in the mold 31. Those portions of the molten metal 33 which are in the region close to the internal surface 34 of the wall of the mold 31 will become solidified first owing to the relatively low temperature of said surface 34, and will form a solidified skin or shell 36, during the casting prior to the solidification of the remainder of the metal 33. The progressive formation of the shell 36 can be gleaned from a comparison of Figs. 1, 2 and 3.

Figure 4:
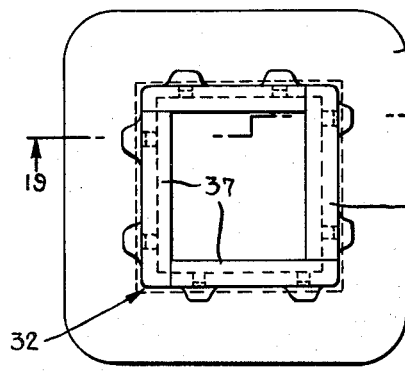
Fig. 4 is a plan view of an assembled hot top disposed on a mold.

The hot top, as best shown in Fig. 4, may be composed of a plurality of plates, for instance four plates 37 which are assembled to form the hot top 32. The hot top 32 may instead also be formed of a single piece, for instance as shown in Figs. 1–3; though in the following some of the modifications are described as being composed of various modified individual plates, it will be understood that the various hot tops may instead be made of a single piece each.

The sides of the hot top 32 are adjacent the parts of the internal mold surface 34 to serve the general purpose of a hot top to prevent the top of the cast metal from solidifying too rapidly.

From the bottom of the hot top 32 there project anchoring means, such as one or more anchoring elements 38, that reach into the region adjacent the internal mold surface 34 to be frozen to the shell 36 upon solidification of that shell ahead of the solidification of the remainder of the cast metal 33. Each element 38 may be in the form of plate iron, or sheet metal, or may be composed of metal wires, strips, round iron or any other refractory material with sufficiently large dimensions so as to avoid that the heat of the molten metal 33 melt or destroy the anchoring elements 38.

When in the course of pouring of the casting metal 33 into the mold 31 the level 39 reaches the height shown in Fig. 2, the anchoring element or elements 38 will freeze to the solidifying shell 36, thereby anchoring the hot top 32, preventing it from rising when the level 39 of the metal 33 enters the interior of the hot top 32 (as shown in Fig. 3).

I have found that the afore-described anchoring action by the anchoring element or elements 38 in connection with the shell 36 is highly effective, allowing to dispense completely with the heretofore customary wedging or clamping or other connections between the hot top and the mold.

The anchoring elements 38 may be attached to the hot top 32 either during or after the manufacture of the plates 37 or of the entire hot top 32, and attachment may be deferred until the actual mounting of the hot top to the mold. The anchoring element or elements 38 may have any suitable shape, some of the preferred shapes merely by way of illustration having been shown in the accompanying drawings.

Figure 6:
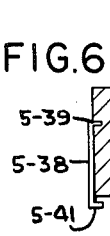
Fig. 6 is a sectional view taken on the line 6—6 of Fig. 5.
Figure 5:
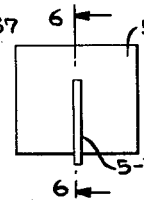
Fig. 5 is an elevational view of a hot top plate in accordance with an embodiment of the invention.

In the embodiment of Figs. 5 and 6, the anchoring element 5—38 has an upper portion 5—39 that extends into the body of the plate 5—37, and has a lower portion 5—41 that extends in the form of a hook or bent finger from the body of the plate or hot top and is spaced from the lowermost confine of the hot top and projects therefrom.

Figure 8:
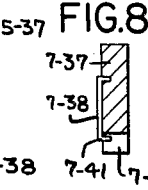
Fig. 8 is a sectional view taken on the line 8—8 of Fig. 7.
Figure 7:
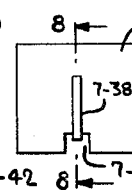
Fig. 7 is an elevational view, similar to Fig. 5, but embodying a modification.

In the embodiment of Figs. 7 and 8, the anchoring element 7—38 is similarly arranged, except that its lower in-turned finger or hook part 7—41 projects into a recess 7—42 of the plate 7—37.

Figure 10:
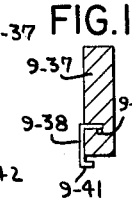
Fig. 10 is a sectional view taken on the line 10—10 of Fig. 9.
Figure 9:
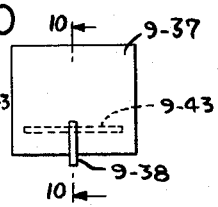
Fig. 9 is an elevational view, similar to Fig. 5, but embodying a further modification.

In the embodiment of Figs. 9 and 10, a reinforcing element 9—43 is imbedded in the body of the plate 9—37, and the anchoring element 9—31 abuts from above against, or is connected to, the reinforcing element 9—43. The hook or finger part 9—41 again extends free from the plate 9—37.

Figure 12:
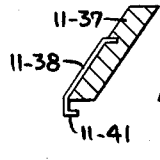
Fig. 12 is a sectional view taken on the line 12—12 of Fig. 11.
Figure 11:
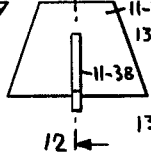
Fig. 11 is an elevational view, similar to Fig. 5, but embodying a still further modification.

In the embodiment of Figs. 11 and 12, the plates 11—37 when assembled into a hot top will form a hollow frusto-pyramidal shape. The anchoring element 11—38 is similar to that of Fig. 5, running alongside the outer surface of the plate body, but being bent at the lower end to project the finger 11—41 in a manner similar to that of Figs. 5 and 6.

Figure 14:
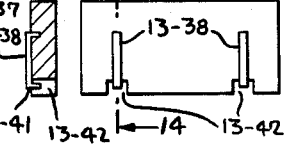
Fig. 14 is a sectional view taken on the line 14—14 of Fig. 13.
Figure 13:
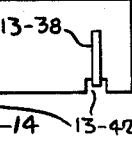
Fig. 13 is an elevational view, similar to Fig. 5, but embodying another modification.

The embodiment of Figs. 13 and 14 is similar to that of Fig. 7, except that the body of the plate 13—37 has two recesses 13—42, and each plate 13—37 is provided with two anchoring elements 13—38.

Figure 16:
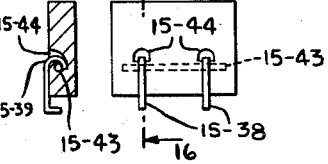
Fig. 16 is a sectional view taken on the line 16—16 of Fig. 15.
Figure 15:
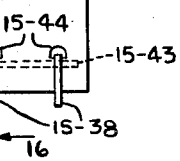
Fig. 15 is an elevational view, similar to Fig. 5, but showing yet another modification.

In the embodiment of Figs. 15 and 16 there is again provided a reinforcing element 15—43, but there are arranged two anchoring elements 15—38, and each has the upper portion 15—39 bent in hook-shape to engage a recess 15—44 of the plate 15—37.

Figure 18:
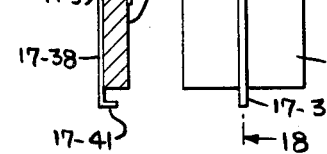
Fig. 18 is a sectional view taken on the line 18—18 of Fig. 17.
Figure 17:
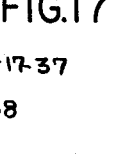
Fig. 17 is an elevational view, similar to Fig. 5, but embodying still another modification.

In the embodiment of Figs. 17 and 18, the upper portion 17—39 of the anchoring element 17—38 engages the top edge of the plate 17—37 for suspension therefrom.

Figure 19:
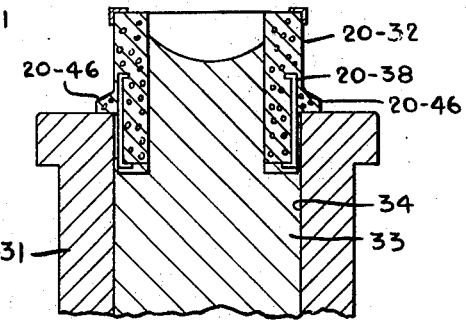
Fig. 19 is a fragmentary sectional view taken on the line 19—19 of Fig. 4.

In the embodiment of Figs. 4 and 19, the hot top 20—32 is shown in connection with a mold 20—31 from which the metal 33 has risen into the hot top. The hot top 20—32 is provided with abutments 20—46 to facilitate suspension of the hot top on the chill mold. The hot top 20—32 is composed of plates similar to those of Figs. 7 and 8, except that the anchoring elements 20—38 are embedded in the body of the plates 20—37 instead of being run alongside the outer surfaces thereof.

Figure 20:
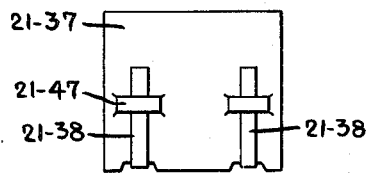
Fig. 20 is a fragmentary side elevational view of a still further modified hot top.

In the embodiment of Fig. 20, each plate 21—37 has, similar to the modification of Fig. 13, two anchoring elements 21—38, and dogs 21—47 are provided for attaching the anchoring elements 21—38 to the hot top.

Figure 21:
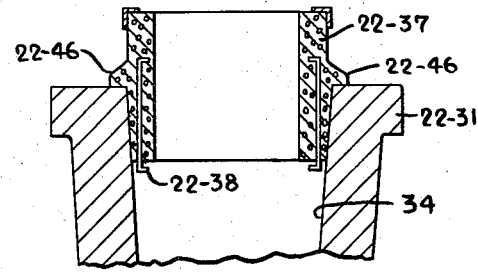
Fig. 21 is a fragmentary sectional view, similar to Fig. 19, but showing a still further modified hot top on a mold.

In the embodiment of Fig. 21, the anchoring elements 22—38 are in the form of wires embedded in the body of the plates 22—37.

Figure 23:
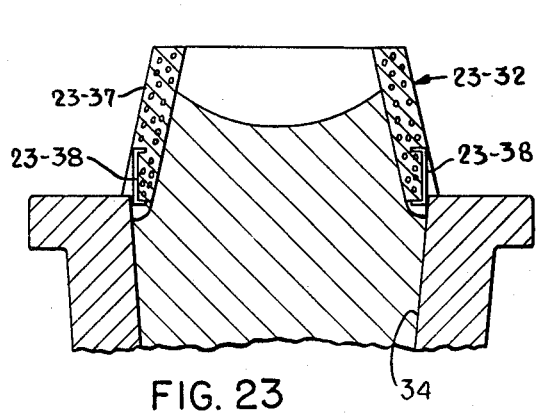
Fig. 23 is a fragmentary sectional view taken on the line 23—23 of Fig. 22.
Figure 22:
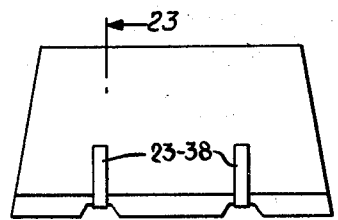
Fig. 22 is a side elevational view of a hot top similar to Fig. 11, though embodying a further modification.

In the embodiment of Figs. 22 and 23, a frusto-pyramidal hot top 23—32 is shown, similar to the modification of Figs. 11 and 12, except that the anchoring elements 23—38 are not bent at any acute angle but are disposed along their major extension vertically through the body of the plates 23—37, rather than being disposed alongside the external surface thereof.

The operation is as follows:

After the hot top 32 is emplaced on the mold 31, the anchoring elements 38 project into an outer region within the chamber of the mold, which region is adjacent the internal mold surface 34. When thereafter the metal 33 is poured in molten form into the mold 31, the part of the metal that is in the outer region of the mold chamber will solidify and will freeze the anchoring elements 38.

Certain of the advantages of the invention have already been referred to. It may be useful, however, to allude particularly at this point to the fact that virtually any kind of suitable hot top, whether porous or solid throughout, whether combustible or refractory, can be equipped with anchoring elements of the instant type for the purpose of retention on the mold.

I wish it to be understood that I do not desire to be limited to the exact details of construction shown and described, for obvious modifications will occur to a person skilled in the art.

Having thus described the invention, what I claim as new and desire to be secured by Letters Patent, is as follows:

1. A hot top, for use in connection with a mold for casting metal and adapted to be placed near the top of said mold, comprising in combination, a body, and anchoring means extending from said body into the mold interior adjacent the internal mold wall surface and adapted to be immersed in the rapidly solidifying outer portion of the molten mass adjacent the internal mold surface and to be frozen thereto when said outer portion solidifies in form of a shell prior to the completion of casting, said body having a recess in its lower edge, said anchoring means comprising an element including a first portion connected to said body and a second portion disposed in said recess and spaced from the surfaces of said recess.

2. A hot top, for use in connection with a mold for casting metal and adapted to be placed near the top of said mold, comprising in combination, a body, and anchoring means extending from said body into the mold interior adjacent the internal mold wall surface and adapted to be immersed in the rapidly solidifying outer portion of the molten mass adjacent the internal mold surface and to be frozen thereto when said outer portion solidifies in form of a shell prior to the completion of casting, said body having a plurality of recesses in its lower edge, said anchoring means comprising a plurality of anchoring elements, each element having a lower portion protruding from said body and into a recess and spaced from the surfaces of said recess.

References Cited in the file of this patent

UNITED STATES PATENTS

| | | |
|---|---|---|
| 724,462 | Garrettson | Apr. 7, 1903 |
| 1,553,019 | Bate | Sept. 8, 1925 |
| 1,911,228 | Gathmann | May 30, 1933 |
| 2,148,583 | Rowe | Feb. 28, 1939 |
| 2,629,152 | Milburn | Feb. 24, 1953 |

FOREIGN PATENTS

| | | |
|---|---|---|
| 386,860 | Great Britain | June 2, 1932 |